United States Patent [19]

Winston et al.

[11] Patent Number: 5,005,958
[45] Date of Patent: Apr. 9, 1991

[54] HIGH FLUX SOLAR ENERGY TRANSFORMATION

[75] Inventors: Roland Winston; Philip L. Gleckman, both of Chicago; Joseph J. O'Gallagher, Flossmoor, all of Ill.

[73] Assignee: Arch Development Corporation, Chicago, Ill.

[21] Appl. No.: 423,616

[22] Filed: Oct. 16, 1989

Related U.S. Application Data

[63] Continuation of Ser. No. 164,069, Mar. 4, 1988, abandoned.

[51] Int. Cl.$^5$ .............................................. G02B 5/08
[52] U.S. Cl. .................................... 350/442; 350/613; 126/438; 126/440
[58] Field of Search ............... 350/442, 613, 619, 167, 350/574; 126/440, 441, 438

[56] References Cited

U.S. PATENT DOCUMENTS

| | | | |
|---|---|---|---|
| 3,624,834 | 11/1971 | Malifaud | 350/442 |
| 4,237,332 | 12/1980 | Winston | 350/629 |
| 4,257,401 | 3/1981 | Daniels | 126/440 |

Primary Examiner—Bruce Y. Arnold
Assistant Examiner—J. P. Ryan
Attorney, Agent, or Firm—Marshall, O'Toole, Gerstein, Murray & Bicknell

[57] ABSTRACT

Disclosed are multi-stage systems for high flux transformation of solar energy allowing for uniform solar intensification by a factor of 60,000 suns or more. Preferred systems employ a focusing mirror as a primary concentrative device and a non-imaging concentrator as a secondary concentrative device with concentrative capacities of primary and secondary stages selected to provide for net solar flux intensification of greater than 2000 over 95 percent of the concentration area. Systems of the invention are readily applied as energy sources for laser pumping and in other photothermal energy utilization processes.

19 Claims, 7 Drawing Sheets

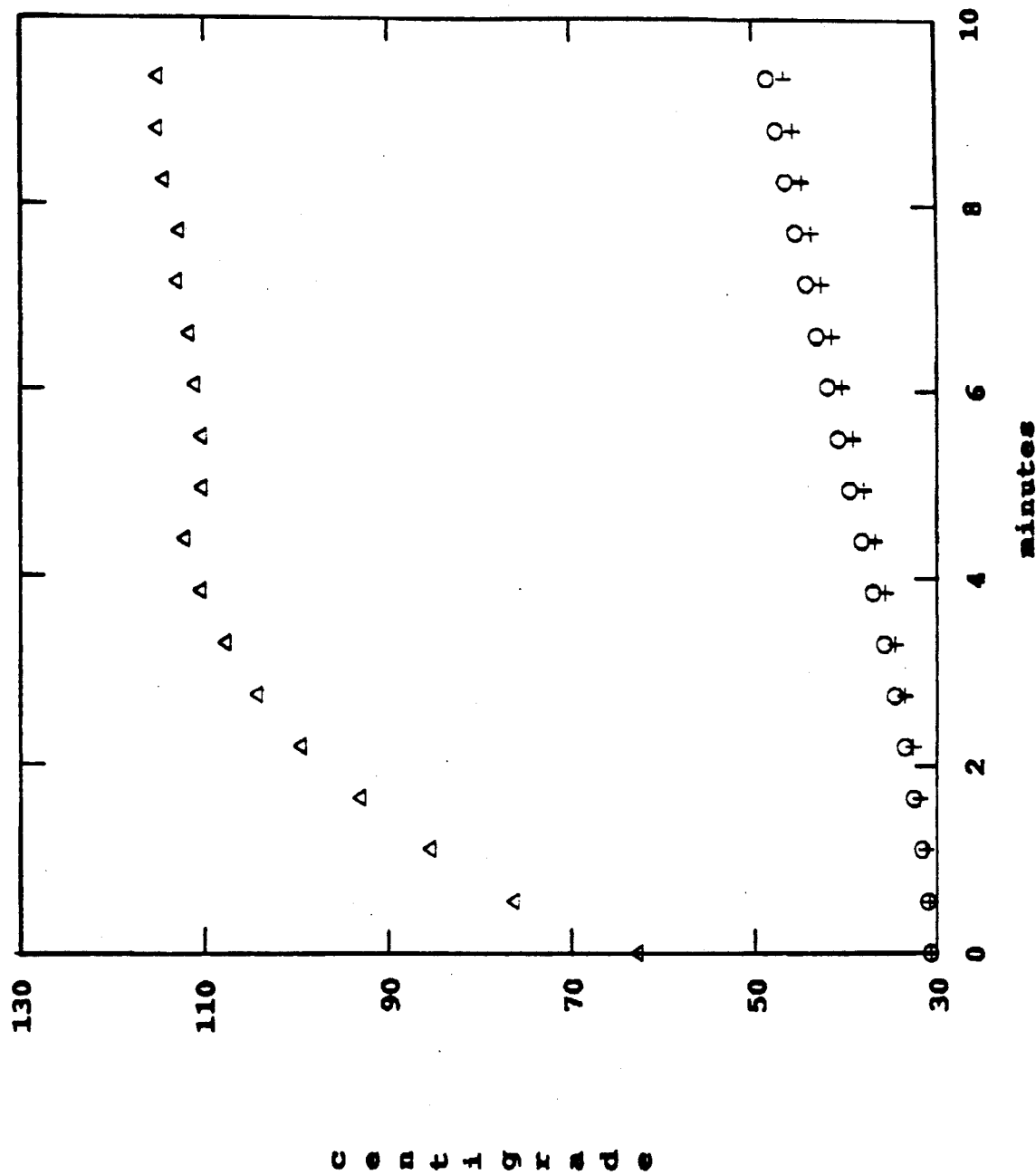

HIGH FLUX SOLAR ENERGY TRANSFORMATION

This invention was made with Government support under subcontract number XX-6-06019 of prime contract number DE-AC02-83-CH10093 between the Department of Energy and the University of Chicago. The Government has certain rights in this invention.

This application is a continuation of application Ser. No. 07/164,069, filed Mar. 4, 1988 abandoned.

BACKGROUND

The present invention relates generally to radiant energy concentration and more particularly to high flux solar energy transformation systems suitable for use as energy sources for a variety of applications including laser pumping.

Numerous potential applications exist for concentrated solar photothermal energy. As one example, solar energy has been proposed as an energy source for the pumping of (e.g., satellite-based) neodymium-doped YAG crystal lasers [see, e.g., Young, *Applied Optics*, 5(6), 993-997 (1966); Arashi et al., *Japanese Journal of Applied Physics*, 21(8), 1051-1053 (1984); and Weksler et al., "Solar Pumped Solid State Lasers" *SPIE Proceedings*, 736, (Jan. 15-16, 1987)] through use of focusing concentrators capable of "point" solar concentrations of about 10,000 suns at their focal plane. The laser pumping systems described have limited application because Nd:YAG is not a good absorber of solar energy. Solar energy application to the pumping of other laser sources, especially tunable lasers such as GSGG, alexandrite or Rhodamine 6G, has simply not been available, owing principally to the lack of systems capable of providing pumping thresholds on the order of 10,000 suns within the more limited absorption band (approximately 20 percent of the solar spectrum) within the broad band solar energy supplied. Indeed, prior attempts to secure extremely high solar energy flux intensification have completely failed to provide results even approaching factors of 50,000 suns or more needed to provide 10,000 suns in the relevant spectrum for pumping lasers of this type. It is noteworthy, for example, that the highest "peak" solar flux (within a small area at the center of the solar beam) reported to have been achieved was 1.6 kW cm$^{-2}$ (which corresponds to a solar intensification of about 16,000 suns). When measured over an area capturing approximately 95 percent of the total energy, however, the average irradiance amount only to about 1300 suns. [See, Solar Thermal Test Facilities Users Association Newsletter, Apr. 30, 1980.]

Prior failures to achieve high flux concentrations are due to inherent properties of focusing (e.g., parabolic mirror) systems employed. A parabolic mirror forms an aplanatic image of the center of the sun in the center of its focal plane. It follows then from brightness conservation that the irradiance at the center of the image is given by $$\sigma T^4 \sin^2\phi$$

where $\sigma$ is the Stefan-Boltzmann constant, T is the absolute temperature, and $\phi$ is the rim angle, i.e., the semi-angle subtended by the parabola from the center of the focal plane. According to this formula, one can achieve the n=1 thermodynamic limit of irradiance at the center of a 90° rim angle paraboloid.

Off-axis aberrations spread the image, so that the irradiance decreases from the center. In fact, for the 90° rim angle mirror the energy tails extend to infinity. A simple geometrical argument has been given to determine the minimum area required to collect 100 percent of the energy in the focal plane for any rim angle. The average geometric concentration ratio over this area is given by $$\frac{\cos^2\phi \sin^2\phi}{\sin^2\theta_{sun}}$$

This concentration ratio is a maximum for a 45° rim angle, where it has a value of 11,500.

Apart from laser pumping applications directed to communication systems and potentially to radioisotope separation, extremely high solar flux concentration systems are conspicuously susceptible to use in procedures for determination of thermophysical properties (expansion, conductivity and the like) of various materials including high temperature ceramics, for the disposal of hazardous wastes by photothermally-induced reactions, for effecting high flux combustion, and for simulation of photothermal effects of nuclear explosion.

Of interest to the background of the invention are reports of developments by co-applicant Winston and his co-workers in the field of "non-imaging" optics applied to the transformation of radiant energy, including solar energy. See, e.g., W. T. Welford and R. Winston, *The Optics of Non-Imaging Concentrators*, (Academic Press, New York, 1978). Non-imaging concentrators are developed according to two basic design principles: the "extreme ray" or "maximum slope" principle (see, e.g., U.S. Pat. Nos. 3,923,381; 3,957,031; 4,002,499; 4,003,638; 4,045,246; 4,114,592; 4,130,107; 4,230,095; 4,240,692; and 4,483,007); and the "geometric vector flux" principle [see, e.g., U.S. Pat. No. 4,237,332; O'Gallagher et al., *Solar Energy*, 36(1), 37-44 (1986); Winston, *SPIE Proceedings*, 692, 224-226 (1986); and O'Gallagher et al., *J. Opt. Soc. Am.*, 4, 66-68 (1987)]. Non-imaging concentrators may optionally be "filled" with a refractive, "dielectric" fluid or formed from a refractive solid, allowing for enhancement in concentrative capacity [see, e.g., U.S. Pat. No. 4,240,692; Ning et al., *J. Opt. Soc. Am.*, 26, 300-305 (1987); and Ning et al., *J. Opt. Soc. Am.*, 26, 1207-1212 (1987)].

Of particular interest to the background of the invention are proposals for development of composite, multistage systems involving both focusing and non-imaging devices for the concentration of radiant energy, including solar energy. See, e.g., Baranov, *Applied Solar Energy*, 2(3), 9-12 (1968); Ploke, *Optik*, 1, 31-43 (1967); and Winston et al., *Applied Optics*, 19, 347-351 (1980). Such composite devices, when employed in solar furnace and photovoltaic transformation applications, are generally designed to include relatively "fast" primary mirrors or lenses with focal ratios on the order of 0.5 to about 1.5 and non-imaging secondary concentrators with concentrative capacities on the order of 10 to 20.

There continues to exist a need in the art for novel systems capable of effecting high flux solar radiant energy transformation for use in a variety of photothermal energy application. Ideally, such systems would be capable of providing uniform concentration of solar flux with net solar intensification by factors in excess of those heretofore achieved.

BRIEF SUMMARY

According to the present invention, multistage solar radiant energy transformation systems are provided which allow for solar energy intensification by factors well in excess of any heretofore achievable.

In brief, systems of the invention are seen to comprise a primary solar energy focusing device (preferably a mirror or lens) associated with a secondary, non-imaging energy-concentrator (preferably shaped according to extreme ray or geometric vector flux principles). The secondary stage is disposed at or near the focus of the primary stage device to receive solar energy therefrom and the concentrative capacities of primary and secondary stages are selected and coordinated to allow for a minimum solar intensification of at least 2000 suns, uniformly distributed at the second stage energy exit aperture (i.e., distributed over an area intercepting 95 percent of the concentrated energy). Preferred systems readily achieve uniformly distributed concentrations of 10,000 suns or more, and those systems including a secondary concentrator which comprise a high refractive index solid or fluid refracting medium are capable of providing intensification of greater than the 46,000 sun theoretical maximum concentration in air. Typically, the primary stage has a focal ratio of greater than 2.0 and the secondary stage is designed to concentrate by a factor of about 50 or more. Refractive medium filled systems include solid or fluid media which preferably having a refractive index in excess of about 1.3. Solid refractive non-imaging second stage concentrators may be provided which are totally internally reflective.

A presently preferred prototypical embodiment of the systems of the invention comprises a primary focusing mirror device having a focal ratio of about 2.5. Disposed at the focus of the primary mirror is a secondary non-imaging device filled with a refractive oil (having a refractive index of about 1.53) and designed for a concentration by a factor of about 60. As verified by calorimeter, this illustrative system allows for solar intensification of approximately 60,000 suns and a corresponding irradiance of about 5 kW cm$^{-2}$. Systems of the invention are readily applied as energy sources for laser pumping and in other photothermal energy utilization processes.

Further aspects and advantages of the invention will be apparent upon consideration of the following detailed description of an illustrative embodiment thereof, reference being made to the drawing wherein:

FIG. 1 is a schematic representation of a two-stage system according to the invention;

FIG. 2 graphically represents irradiance distributions derived from a Monte Carlo raytrace program for primary and secondary stages of a device according to the invention;

FIGS. 3 and 4 illustrate operation of a second stage device in practice of the invention; and FIGS. 5, 6 and 7 illustrate results of procedures to determine exit irradiance in practice of the invention.

DETAILED DESCRIPTION

The present invention relates to multi-stage solar concentrator devices wherein the major concentrative elements include both focusing and non-imaging devices whose designs are selected and coordinated to achieve solar flux intensification approaching thermodynamic limits. The assembly and operation of system components according to the invention is believed to be clearly illustrated by the following examples wherein Example 1 relates to the construction of a two-stage device and Example 2 relates to the use of the device to secure uniform irradiance over the entirety of the exit aperture of the secondary concentrator which is nearly four times the highest irradiation previously reported to have been achieved over an extremely limited area and well in excess of 20 times the irradiation reported to have been achieved over an area intercepting 95 percent of the solar energy.

EXAMPLE 1

Figure 1:
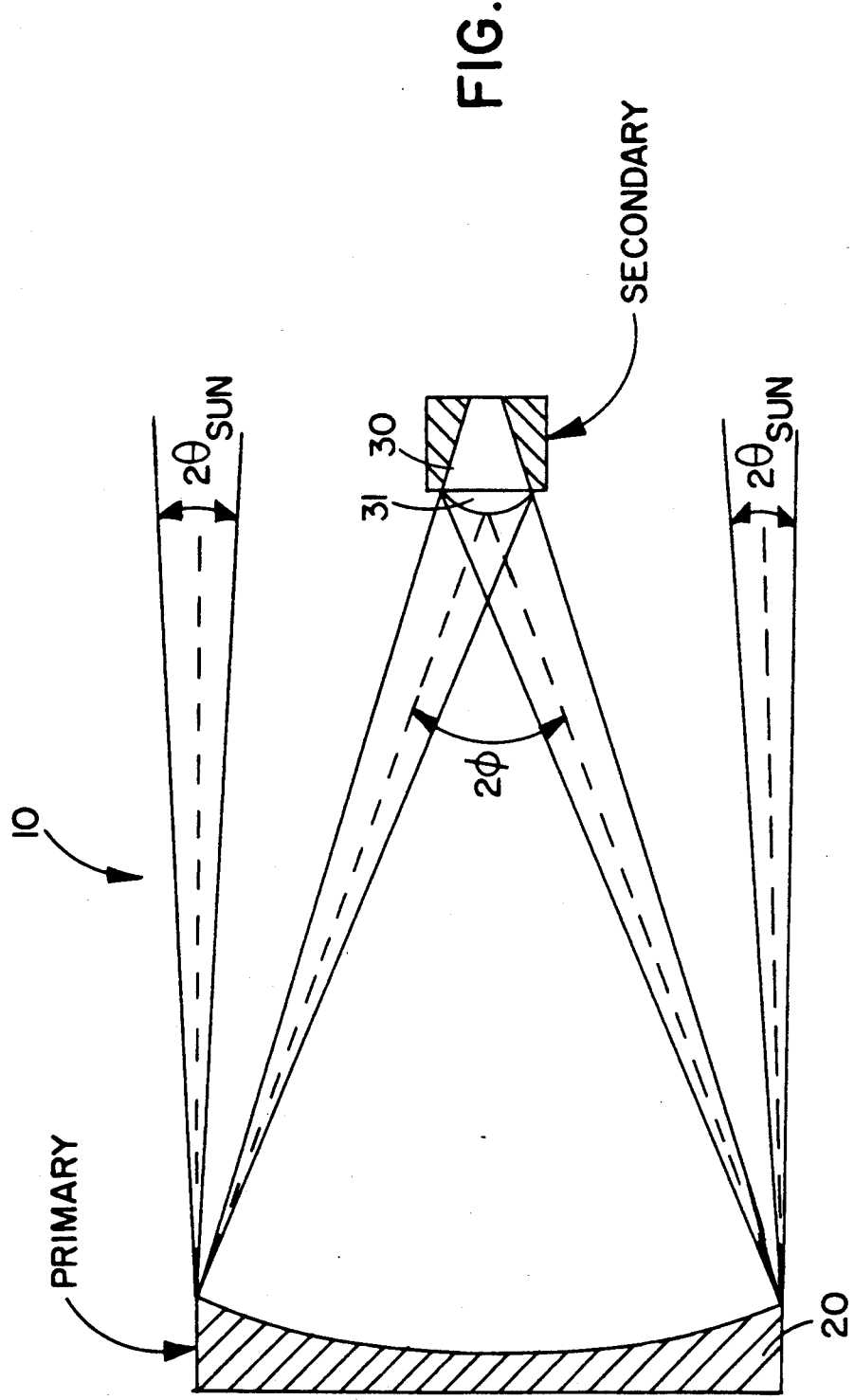

Construction of a multi-stage apparatus according to the invention is illustrated in FIG. 1, wherein the system 10 is seen to include, as a primary stage a focusing mirror and as a secondary stage a non-imaging concentrator 30.

In the embodiment constructed, the primary stage mirror was a 40.6 cm parabolic telescope mirror, with a thickness to diameter ratio of 1:6. The mirror is designed to have a rim angle of 11.5 degrees, generating a focal ratio of 2.5 and a theoretical maximum concentrative capacity at its 0.98 diameter image of 730. The mirror was held on an equatorial mount (not shown) which continuously tracks the sun, and supported on a Novak nine-point flotation mirror cell. Also attached to the mount was an Eppley normal incidence pyrheliometer (NIP) which continuously measured solar beam radiation. Focusing of the solar image on the secondary stage was done visually under attenuated light by adjusting a microscope focusing mechanism. The highest irradiance was achieved with a chemical silver coating on the primary. Because it would have reduced the broadband reflectivity, no protective dielectric overcoat was used on the silver. Protection was provided instead by keeping the mirror in a nitrogen enriched environment.

Figure 3:
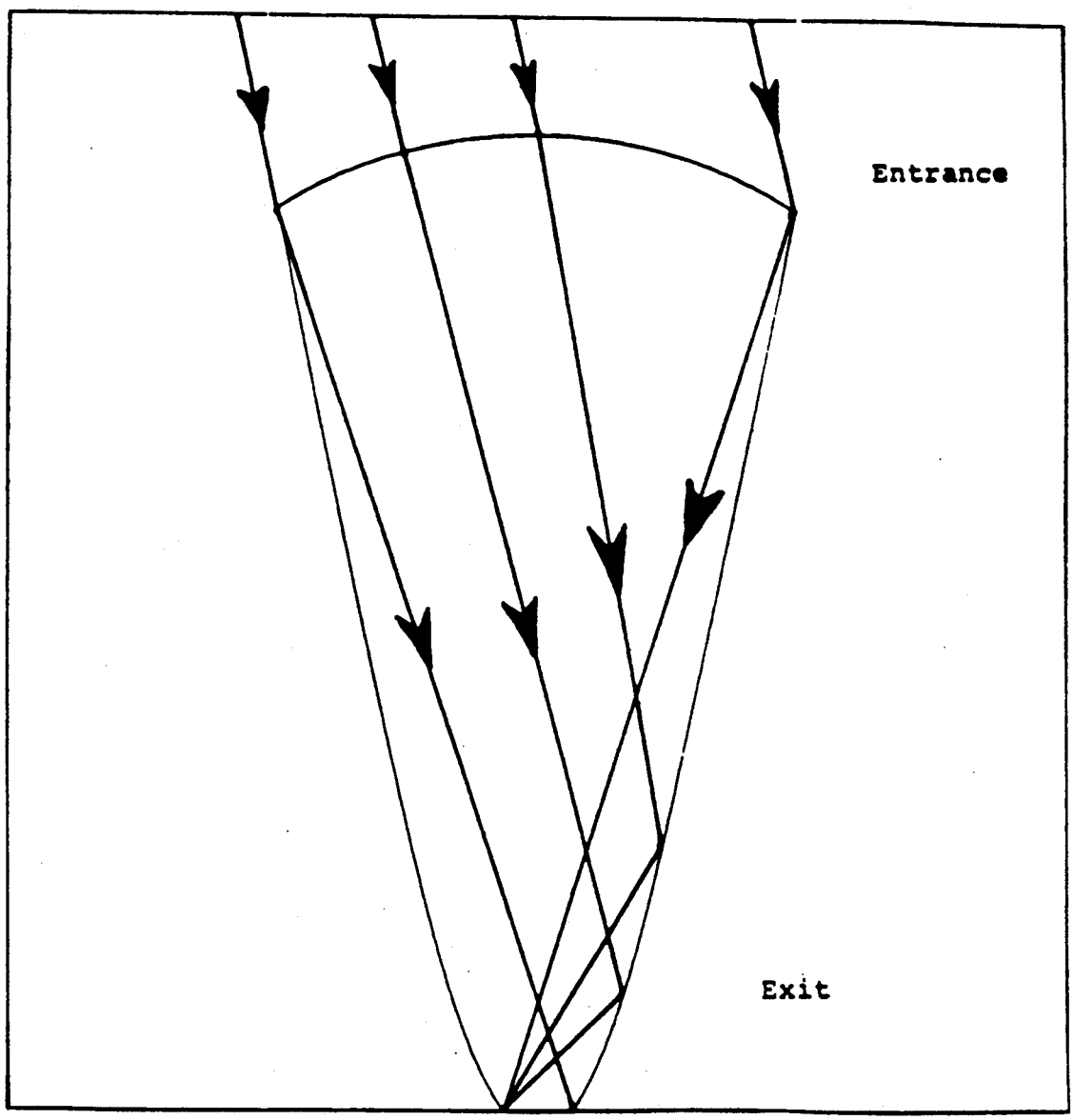

Non-imaging concentrator 30 is disposed at the focal plane of mirror 10. For use in this prototype, the secondary concentrator was designed according to the extreme ray non-imaging concentrator principle [as illustrated, for example, in Winston, *SPIE Proceedings*, 692, 224-226 (1986)] whereby one images the edge of the source at the edge of the exit aperture as illustrated in FIG. 3. The concentrator thus included a hollow vessel 31 fabricated from 99.9 percent pure silver which had been melted and hydraulically pressed onto a convex mandrel machined to a tolerance of a few thousandths of an inch. The resulting vessel was 1.2 cm long, had an entrance aperture of 0.98 cm, an exit aperture of 1.27 mm and an acceptance angle of 11.5, resulting in a theoretical maximum concentration (air-filled) capacity of 59.7.

The vessel was then filled with immersion oil (1160, R.P. Cargille Laboratories, Cedar Grove, N.J.) which was selected for its high index of refraction and transmissivity over the solar spectrum. The index of refraction was measured using a hollow prism spectrograph at various visible wavelengths of mercury. The infrared index was extrapolated using the Cauchy equation and was found to range from 1.52 at 1000 nm to 1.56 at 400 nm. The internal transmission of 1 cm of the oil was measured using a Perkin-Elmer Model 330 spectrophotometer and it was found that the solar average transmission for 1.2 cm of the oil (the oil depth in the secondary) was calculated to be 91%.

Figure 4:
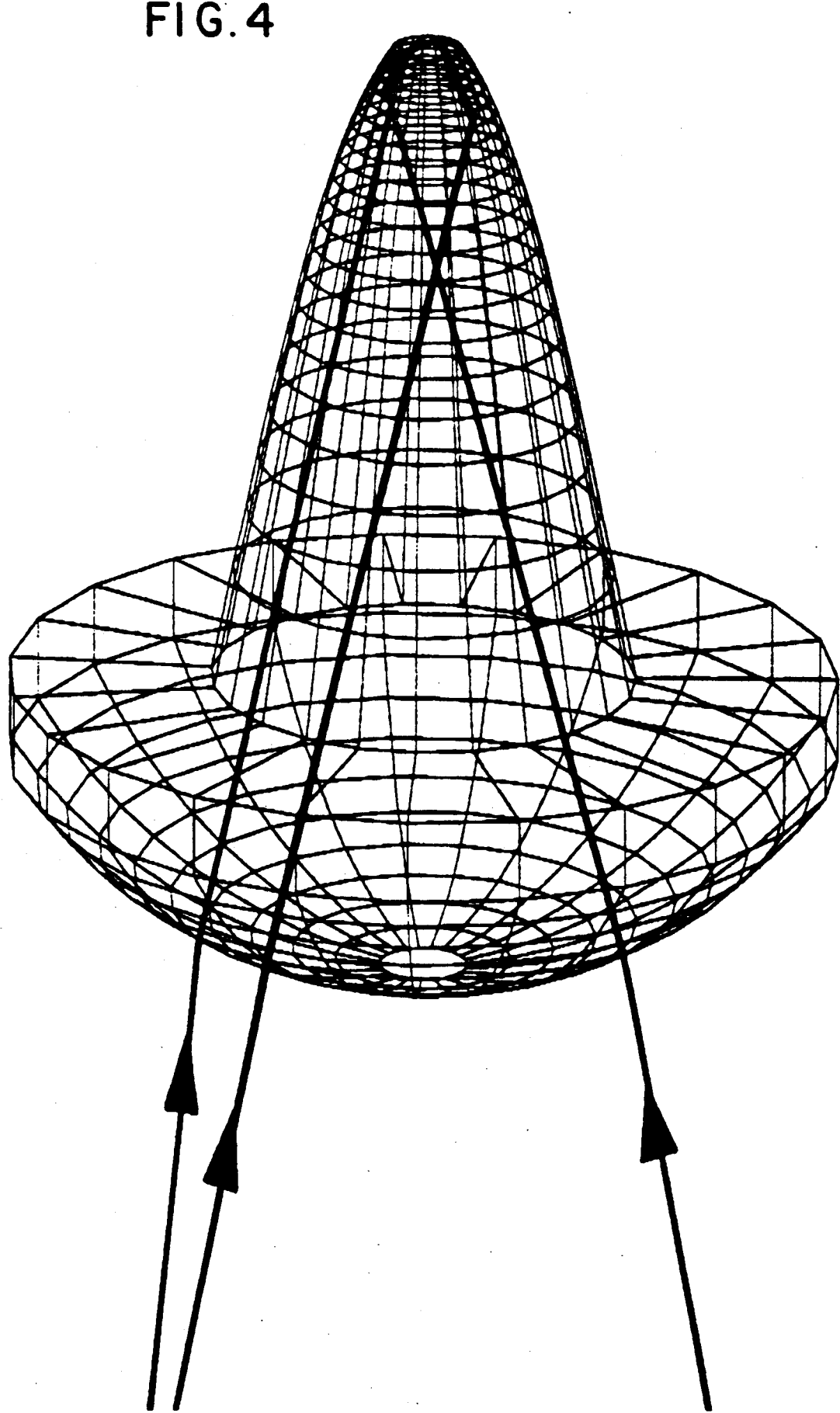

The vessel was capped by a plano-convex lens 31 (Schott BK-7) which has an index of 1.51 in the visible. See FIG. 4. The secondary stage was assembled in the following sequence. First, the lens was mounted in between the empty vessel and a flange which has an aperture the size of the solar image. Next, the oil was injected with a syringe through the exit aperture. Finally, the complete secondary is kept under vacuum until bubbles and dissolved gases are removed.

In order to reduce the amount of heating in the secondary, a filter was constructed to remove light that would be absorbed by the oil in the secondary. The ideal filter for this job consists of two thin anti-reflection coated glass windows surrounding an optimized thickness of the same oil used in the secondary. A 1 cm thickness was chosen on the basis of a tradeoff between lowering absorption in the secondary and maintaining a high throughput. The overall effect of the filter was to halve the absorption in the secondary while reducing the net transmission by only 3.7%.

By placing a nonimaging secondary device 30 in the focal plane of the parabolic mirror 20, an irradiance at the thermodynamic limit can be produced uniformly over the entire exit aperture. Furthermore, because the secondary stage is filled with a material with index of refraction (n) greater than one, the thermodynamic limit is increased by a factor of $n^2$. In a two-stage system, the secondary stage entrance aperture is made to coincide with the solar image, and the acceptance angle of the secondary is made to coincide with the rim angle of the primary and the etendue is conserved. The index of refraction and the acceptance angle of the secondary determine its concentration, according to the theoretical limit:

$$\frac{n^2}{\sin^2\phi}$$

The net geometric concentration of a two-stage nonimaging concentrator is therefore the product of the concentration of each stage.

$$\frac{\cos^2\phi \sin^2\phi}{\sin^2\theta_{sun}} \times \frac{n^2}{\sin^2\phi} = \frac{n^2\cos^2\phi}{\sin^2\theta_{sun}}$$

(The factor of $\cos^2\phi$ is due to the comatic aberration of the primary.)

The two-stage concentrator consisting of an 11.5° (f/2.5) rim angle primary mirror, and the secondary stage filled with a medium having a refractive index of 1.53 allows a net geometrical concentration ratio of 102,000, the aberrations causing only a 4% reduction from the thermodynamic limit.

Figure 2:
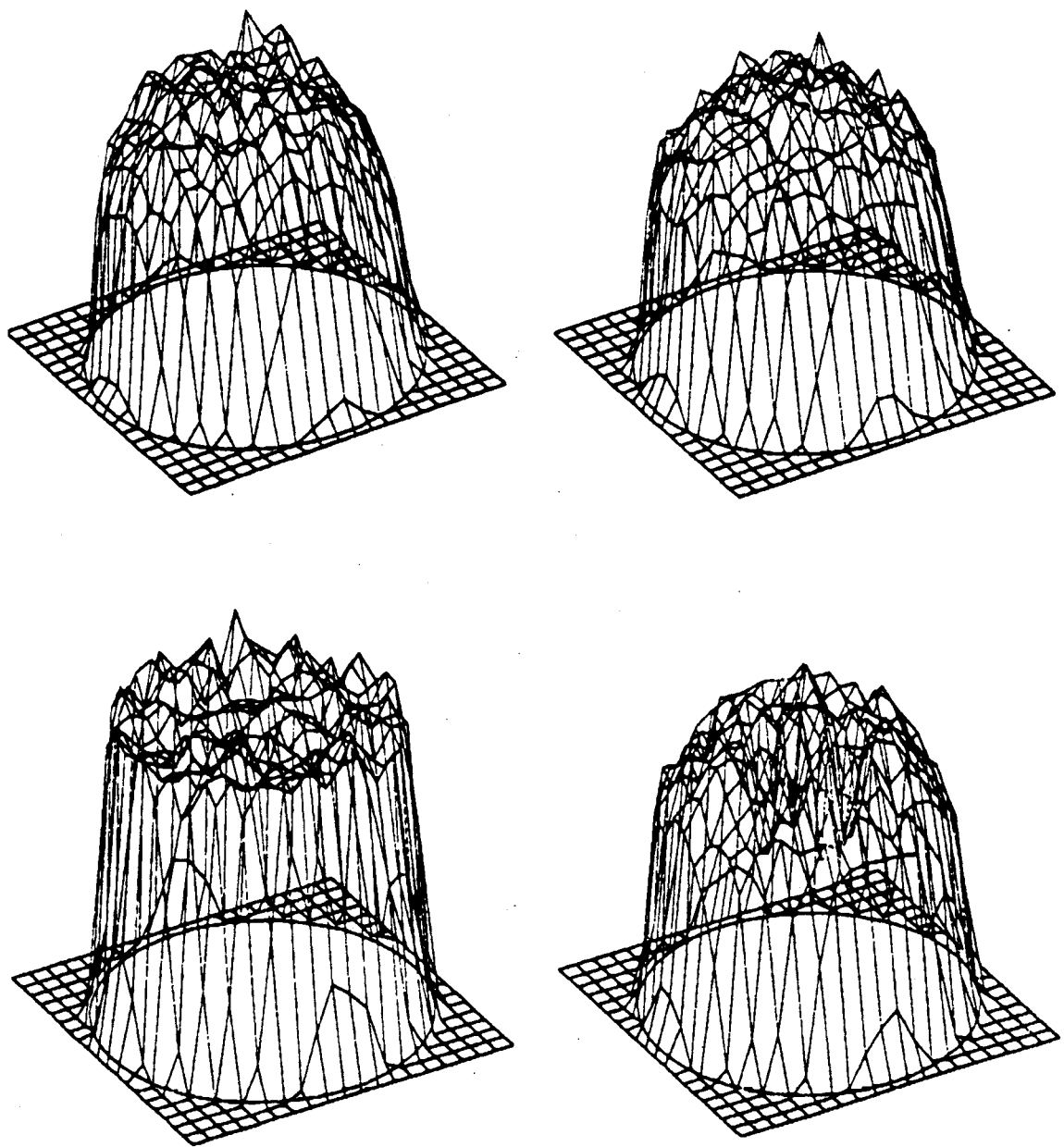

FIG. 2 shows the results of irradiance distributions for the secondary stage, non-imaging concentrator as calculated with a Monte Carlo raytrace program. The upper left plot depicts the entrance in position space with the circle corresponding to the entrance aperture; the upper right plot depicts the secondary stage exit in position space with the circle corresponding to the exit aperture; the lower left plot is of the secondary entrance in direction cosine space with the circle corresponding to the primary reflector rim angle; and, the lower right plot is of the secondary exit in direction cosine space with the circle corresponding to 90°. All four plots show a high degree of uniformity. The spatial entrance distribution is slightly rounded as a result of limb darkening. The uniformity at the exit is a consequence of two factors: the average brightness is nearly equal to the thermodynamic limit, and the local brightness must not exceed the limit.

The following example relates to projection and actual measurement of the efficiency in solar flux concentration of the prototype multi-stage system of Example 1.

EXAMPLE 2

Deviations from ideal performance resulting from the optical materials and design employed in assembly of the system of Example 1 were calculated as follows in order to ascertain the likely variance of actual solar energy incidence and geometric projection. Among the primary stage losses were an approximately 3% loss due to reflection inefficiency of the primary mirror and an approximately 15% loss due to extensive, mirror shading as a result of extensive, substantially oversized support elements employed to support the secondary concentrator calorimeter measuring device between the mirror and the solar source. The net primary receiver efficiency was 82.4%. Projected design and material losses in the secondary stage totalled 24.2% based on an estimated 1.5% loss due to lens reflection, a 2.9% loss due to skew rays (the secondary stage being designed in the meridional plane), a 12.7% loss due to energy absorption of the immersion oil, a 7% loss due to intravessel reflections and a 2.4% loss due to lens oversizing needed to insure retention of the refractive fluid. The net projected 75.8% efficiency of the secondary stage, when considered with the 82.4% net primary stage efficiency result in a projected overall efficiency of 62.4% of the geometric limit with a resultant projected output of 63,700 suns.

A preliminary measurement of the efficiency of the secondary stage was made with a solar cell optically coupled to the exit aperture and the secondary concentrator in place at the primary mirror focal plane. An unsilvered primary was used to keep the light level low. Reflection off the glass surface of the uncoated mirror was sufficient to make the measurement. The measurement agree with the above calculation within three percent.

The outstanding solar flux concentration characteristics of the exit irradiance of the two-stage system make it difficult to measure: it is extremely intense, lambertian, and contained in a dielectric. The intensity exceeds damage thresholds for commercial thermopile-type power meters. The lambertian nature requires a detector insensitive to incidence angles. Unless the detector is optically coupled to the exit, light is lost because of total internal reflection. All of these problems were solved using an oil filled calorimeter which operates on the principle that all the light emitted in $2\pi$ steradians is absorbed in an oilfilled dewar and thereby raises the temperature of the oil. The temperature rise may be calibrated by an electrical heater.

In the calorimeter employed to measure exit irradiance, the dewar is filled to capacity with 70 ml of the same immersion oil contained in the secondary stage. The dewar is covered by a flange made of G-10, a glass-epoxy composite having a thermal conductivity comparable to the oil.

Nonuniformity in the oil temperature is minimized by stirring continuously during an experimental run, using a magnetic bar which rotates on a shaft at the base of the dewar. The bar is driven by another magnet fixed to a motor outside the dewar. The heating caused by the stirring process is negligible.

The heater employed for calibration was composed of Teflon sewn with nichrome wire, and had a resistance of 9 ohms. The DC electrical power was determined from the product of the measured current and measured four-wire voltage.

Two light-shielded nichrome-constantan thermocouples were at different, shallow and deep positions in the oil. Without shielding, the thermocouples warm up very quickly from direct optical absorption. A third thermocouple is inserted tightly into the body of the cast silver secondary concentrator vessel.

Figure 5:
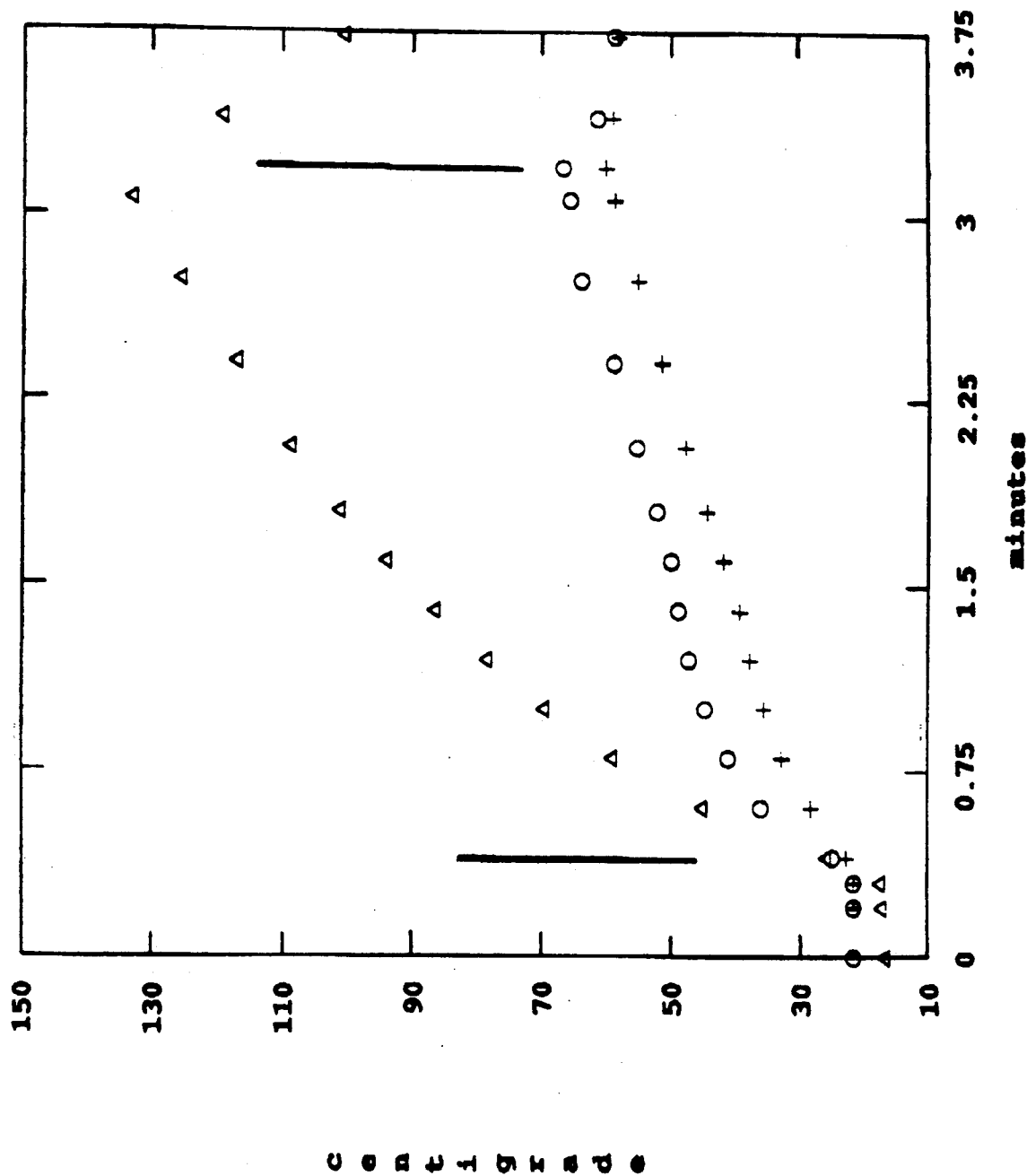

A high irradiance testing procedure was performed by first measuring the temperature rise of the oil when the primary is illuminated. Typical warm-up curves are shown in FIG. 5. This Figure plots temperature versus time during solar heating with triangles, circles and crosses respectively indicating the concentrator vessel and shallow and deep thermocouple readings, and vertical bars indicating the opening and closing of the primary mirror to sunlight. The average rate of temperature rise, $\Delta T_{sun}/\Delta t$ was taken from the temperature at the starting point (primary open) and at the isothermal ending point (primary closed). Readings from the two thermocouples in the oil were averaged. The final temperature was chosen low enough so that the oil refractive index and vessel reflectivity are not significantly reduced. The boiling point of the oil is 370° C. at one atmosphere pressure. The average rate of temperature rise for this run was 0.2428° C./sec., and the average beam insolation was 888 Wm$^{-2}$.

Figure 6:
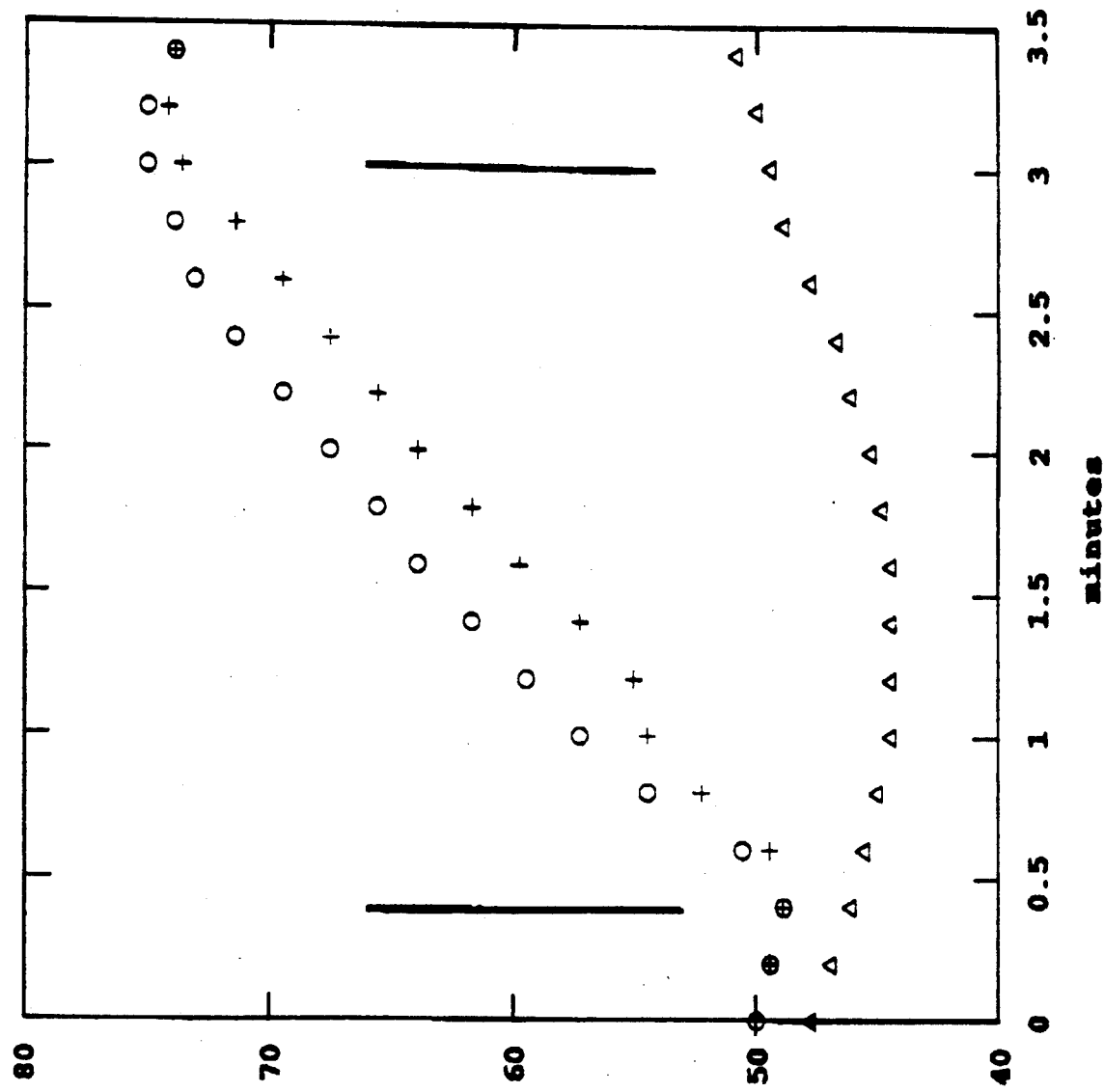

Right after the oil has cooled, the temperature rise due to electrical heating was measured with the primary mirror completely blocked. The heater warmup curves are shown in FIG. 6. The average rate of temperature rise $\Delta T_{el}/\Delta t$ was determined the isothermal points at which the heater was turned on and off (vertical bars). The average rate of temperature rise was 0.161° C./sec. The electrical power, $P_{el}$, was 51 Watts.

In the case of the solar heating, the secondary vessel temperature was higher than that of the oil. This means that an amount of heat $Q_{sun}$ is transferred by convection from the secondary to the oil. The reverse occurs when the electrical heater is turned on; the oil gives up an amount of heat $Q_{el}$ to the secondary. The convective heat transfer, though small, must be included to determine the true optical power, $P_{opt}$. Once $Q_{sun}$ and $Q_{el}$ are determined, the optical power is calculated by $$P_{opt} = \frac{\Delta T_{sun}/\Delta t}{\Delta T_{el}/\Delta t} (P_{el} - Q_{el}) - Q_{sun}$$

An independent measurement of the heat transfer coefficient h from the secondary vessel to the oil is needed to determine the convective heat transfer, as:

$$Q = h A \Delta T/2$$

where $\Delta T$ is the oil-secondary temperature difference at the end of the run, and A is the secondary vessel cross-sectional area, 1.27 cm$^2$. The factor of one-half derives from the fact that the initial temperature difference is zero.

The heat transfer coefficient was determined by measuring the temperature rise of both the oil and secondary vessel while heat was being applied to the vessel by a soldering iron. The conditions were kept exactly the same as during the solar heating experiment: the dewar was upside-down, and the oil was stirred. The warm-up curves are shown in FIG. 7. The temperature rises were calibrated by the electrical heater.

A value for h of 947±100 m$^{-2}$ C$^{-1}$ was obtained. Therefore, $Q_{sun}$ is 4.1 W and $Q_{el}$ is 1.3 W. With this (7%) correction, a value of $P_{opt}$ of 61.4 W is determined. Dividing $P_{opt}$ by the exit aperture area gives an irradiance of about 5 kW cm$^{-2}$.

The irradiance ratio is defined as the ratio of the irradiance exiting the concentrator to the incident direct irradiance as measured using a normal incidence pyranometer (NIP). The NIP measures all of the incident irradiance contained within its 2.75° acceptance angle and because the sun subtends only 0.27°, the NIP measurement includes circumsolar radiation. The circumsolar to beam (circumsolar plus direct) ratio was measured using a solar cell. The cell was placed in the primary focal plane. A mask with an aperture equal to the size of the solar image was mounted on the cell. The light was attenuated with aluminum coated glass. The short circuit current was measured with an without the mask. The resulting circumsolar ratio was found to be 10%. The ratio of the exit irradiance to the direct insolation was thus determined to be on the order of 60,000±5,000 suns.

Numerous modification and variations in practice of the invention are expected to occur to those skilled in the art upon consideration of the above illustrative examples. As previously indicated, systems of the invention are susceptible to application in the provision of energy for pumping lasers. The laser design contemplated for a solid state laser rod has one end of the rod optically coupled to the secondary exit aperture. This end is coated with a dielectric mirror which is transparent to the pump light but reflective at the emission wavelength. The other end of the rod is either uncoated for an external output mirror or coated with a partially transparent dielectric mirror. The rod sides are uncoated and the rod maintains high pump concentration using total internal reflection. Preliminary estimates of substantial comparative efficiencies of solar pumped dye lasers in keeping with the invention (compared, for example, to argon ion pumped lasers) take into account the fact that the overall efficiency of the system is essentially limited only by the efficiency of the dye laser component itself in solar pumped devices.

It will be apparent to those skilled in the art that delivery of solar energy to the primary mirror or lens may be accomplished by a heliostat, allowing the avoidance of potentially cumbersome equatorial mounting of the composite system.

Clearly, substantial increases in overall projected efficiencies over and above those noted in Example 2 are available through relatively modest modifications in design and selection of optical materials selection. In use, projected efficiency losses in the primary stage can be lessened substantially by more efficient mounting of the secondary transducer and by the elimination of the bulky calorimeter employed for testing purposes, bringing shading losses to the range of 5% and allowing for a net primary stage efficiency of about 92.4%. Similarly, use of a clear high index glass solid secondary concentrator, for example, would be expected to eliminate all but about 2% of the 12.7% energy loss attributable to the fluid absorption encountered in the oil-filled device and entirely eliminate the 2.4% loss due to the lens oversizing (required to safely "contain" the oil). Skew ray losses may also be eliminated by flow line designs and intravessel reflections would be made negligible through use of a totally internally reflective secondary concentrator. Net secondary stage efficiencies on the order of about 94% could thus be projected and the combined effect of both primary and secondary efficiencies could thus provide for a net system efficiency on the order of 85% rather than 62.4% achieved by the prototype.

Only such limitations as appear in the appended claims should restrict the scope of the present invention.

What is claimed is:

1. A multi-stage solar radiant energy transformation system, said system comprising:
   (a) as a primary stage, a means for focusing solar energy;
   (b) as a secondary stage, a non-imaging means for concentrative transmission of solar energy to an energy exit aperture,
      said secondary stage disposed in energy receiving relation to said primary stage solar energy focusing means, and the concentrative capacities of said primary and secondary stages selected to provide a net solar flux intensification of at least 2000 uniformly distributed at the secondary stage energy exit aperture.

2. The system according to claim 1 wherein the concentrative capacities of said primary and secondary edges provide a net solar flux intensification of greater than 46,000 uniformly distributed at the secondary stage energy exit aperture.

3. The system according to claim 1 wherein said primary stage comprises a focusing mirror device.

4. The system according to claim 1 wherein said primary stage comprises a focusing lens device.

5. The system according to claim 3 or 4 wherein said primary stage device has a focal ratio of greater than 2.0.

6. The system according to claim 5 wherein said primary stage device has a focal ratio of 2.5 or more.

7. The system according to claim 1 wherein said secondary stage non-imaging means for concentrative transmission of solar energy has a concentrative capacity of greater than 50.

8. The system according to claim 1 wherein said secondary stage non-imaging means for concentrative transmission of solar energy comprises a non-imaging transducer shaped according to the extreme ray design principle.

9. The system according to claim 8 wherein said transducer shape is non-parabolic.

10. The system according to claim 1 wherein said secondary stage non-imaging means for concentrative transmission of solar energy comprises a non-imaging transducer shaped according to the geometric vector flux principle.

11. The system according to claim 1 wherein said secondary stage non-imaging means for concentrative transmission of solar energy comprises a refractive medium having an index of refraction greater than 1.0

12. The system according to claim 11 wherein the refractive index of said medium is 1.4. or more.

13. The system according to claim 11 wherein said refractive medium is a solid.

14. The system according to claim 13 wherein the solid refractive medium is clear high index glass.

15. The system according to claim 13 wherein said solid refractive medium is totally internally reflective.

16. The system according to claim 11 wherein said refractive medium is a liquid.

17. The system according to claim 16 wherein said fluid refractive medium is an oil.

18. A system according to claim 1 wherein said secondary stage means for concentrative transmission of solar energy provides a solar energy exit angle of less than 90°.

19. A system according to claim 1 further comprising heliostat means for directing solar energy to said primary stage.

* * * * *